(12) United States Patent
Wurth

(10) Patent No.: US 11,794,924 B2
(45) Date of Patent: Oct. 24, 2023

(54) START/SERVICE AIRCRAFT BATTERY SYSTEM

(71) Applicant: James Wurth, Las Vegas, NV (US)

(72) Inventor: James Wurth, Las Vegas, NV (US)

( * ) Notice: Subject to any disclaimer, the term of this patent is extended or adjusted under 35 U.S.C. 154(b) by 655 days.

(21) Appl. No.: 16/872,269

(22) Filed: May 11, 2020

(65) Prior Publication Data

US 2020/0377228 A1 Dec. 3, 2020

Related U.S. Application Data

(60) Provisional application No. 62/846,657, filed on May 11, 2019.

(51) Int. Cl.
*B64F 1/34* (2006.01)
*B64F 1/36* (2017.01)

(52) U.S. Cl.
CPC .............. *B64F 1/34* (2013.01); *B64F 1/364* (2013.01)

(58) Field of Classification Search
CPC .............. B64F 1/34; B64F 1/364; B64F 5/40
See application file for complete search history.

(56) References Cited

U.S. PATENT DOCUMENTS

| | | | | |
|---|---|---|---|---|
| 6,184,650 B1* | 2/2001 | Gelbman | .............. | H02J 7/0069 320/100 |
| 9,180,977 B2* | 11/2015 | Gatzke | .................... | H02S 20/00 |
| 10,583,938 B2* | 3/2020 | Mehrholz | ............... | B64F 1/362 |
| 2005/0057222 A1* | 3/2005 | Chen | ........................ | H02J 7/00 320/128 |
| 2011/0227537 A1* | 9/2011 | Maleus | ................. | H02J 7/1423 320/116 |
| 2014/0210399 A1* | 7/2014 | Urschel | ..................... | B64F 1/36 320/136 |
| 2015/0322864 A1* | 11/2015 | Dooley | ................. | B64D 35/08 60/788 |
| 2018/0273211 A1* | 9/2018 | Chang | ..................... | H02M 7/44 |
| 2019/0003398 A1* | 1/2019 | Gibson | ................... | F02C 7/275 |
| 2019/0319461 A1* | 10/2019 | Zhang | .................. | B60R 16/033 |
| 2020/0262585 A1* | 8/2020 | Dahl | ..................... | H02J 7/0045 |

* cited by examiner

*Primary Examiner* — Kurt Philip Liethen
(74) *Attorney, Agent, or Firm* — PARSONS & GOLTRY; Robert Parsons; Michael Goltry

(57) ABSTRACT

A start/service aircraft battery system including a housing on wheels/dolly for convenient movement to a space adjacent an aircraft to be started/serviced. An electrical output cable is carried by the housing and attachable to the aircraft to be started/serviced. A control panel on the housing includes a start/service switch having a start position and a service position. A starting battery and a larger service battery are carried by the housing, the starting battery being coupled to the electrical output cable through the start/service switch in the start position and the larger service battery being coupled to the electrical output cable through the start/service switch in the service position. The starting battery is removably attached to the start/service aircraft battery system for individual starting operations.

9 Claims, 8 Drawing Sheets

CONTROL PANEL

SERVICE BATTERY
COMPRISED OF 13 MODULES

START/SERVICE AIRCRAFT BATTERY SYSTEM

CROSS-REFERENCE TO RELATED APPLICATION

This application claims the benefit of U.S. Provisional Patent Application No. 62/846,657, filed 11 May 2019.

FIELD OF THE INVENTION

This invention relates to a dual operating battery starting and service system for use in the aircraft industry.

BACKGROUND OF THE INVENTION

In the aircraft industry it is common prior art to provide diesel driven electrical generators that can be moved to a space adjacent an aircraft and electrically attached by cables. The diesel driven electrical generator powers the aircraft prior to and at start-up and generally remains attached during warm-up and other activities (e.g. loading, unloading, providing conditioned air, lights, etc.), referred to herein as service. It is well-known that the diesel generators create a large amount of pollution in an area that may already be polluted by aircraft engines and the like. Further, supplies of fuel must be kept on hand, the diesel driven electrical generators constantly replenished with fuel, and fuel spills (everyone knows there will be some) cleaned up.

It would be highly advantageous, therefore, to remedy this and other deficiencies inherent in the prior art.

Accordingly, it is an object of the present invention to provide a new and improved start/service aircraft battery system.

It is another object of the present invention to provide a new and improved start/service aircraft battery system that is convenient to use, virtually pollution free, and relatively inexpensive.

SUMMARY OF THE INVENTION

Briefly, to achieve the desired objects of the instant invention in accordance with a preferred embodiment thereof, a start/service provided start/service aircraft battery system including a housing on wheels/dolly for convenient movement to a space adjacent an aircraft to be started/serviced. An electrical output cable is carried by the housing and attachable to the aircraft to be started/serviced. A control panel on the housing includes a start/service switch having a start position and a service position. A starting battery and a larger service battery are carried by the housing, the starting battery being coupled to the electrical output cable through the start/service switch in the start position and the larger service battery being coupled to the electrical output cable through the start/service switch in the service position. The starting battery is removably attached to the start/service aircraft battery system for individual starting operations.

The desired objects of the instant invention are further realized in accordance with a specific embodiment of a start/service aircraft battery system including a housing on wheels/dolly for convenient movement to a space adjacent an aircraft to be started/serviced, an electrical output cable carried by the housing and attachable to the aircraft to be started/serviced. A control panel on the housing includes a start/service switch having a start position and a service position and a bulk charger switch with electrically coupled associated relays. A starting battery and a larger service battery are carried by the housing, the starting battery being coupled to the electrical output cable through the start/service switch in the start position and the larger service battery being coupled to the electrical output cable through the start/service switch in the service position. The housing further includes a charging system having a power source input electrically coupled to the starting battery and through a two stage charger to the larger service battery, the two stage charger being electrically coupled to the larger service battery through the bulk charger switch with electrically coupled associated relays. The starting battery is removably attached to the start/service aircraft battery system for individual starting operations.

In another aspect of the present invention, a method of jump starting and servicing various aircraft including the steps of providing a start/service aircraft battery system comprising: a housing on wheels/dolly for convenient movement to a space adjacent an aircraft to be started/serviced, an electrical output cable carried by the housing and attachable to the aircraft to be started/serviced; a control panel on the housing including a start/service switch having a start position and a service position; a starting battery and a larger service battery carried by the housing, the starting battery being coupled to the electrical output cable through the start/service switch in the start position and the larger service battery being coupled to the electrical output cable through the start/service switch in the service position; and the starting battery being removably attached to the start/service aircraft battery system for individual starting operations; moving the housing adjacent an aircraft to be started/serviced, placing the start/service switch in the start position and connecting the electrical output cable to the aircraft; and once the aircraft is started, moving the start/service switch to the service position.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1:
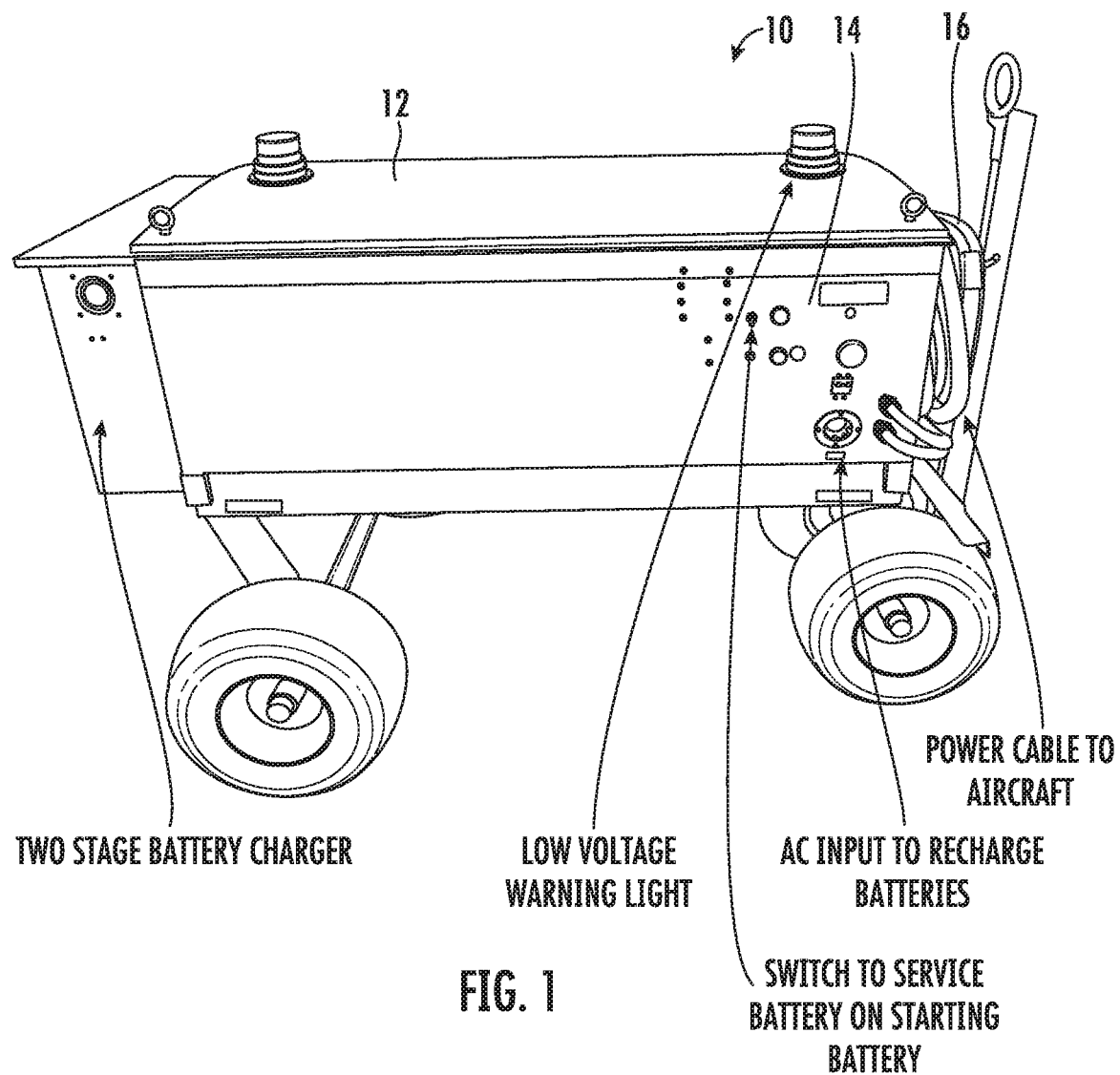
FIG. 1 is a side perspective view of a start/service aircraft battery system, in accordance with the present invention.

Turning to the drawings and specifically to FIG. 1, a start/service aircraft battery system 10 is illustrated. System 10 includes a housing 12 on wheels/dolly for convenient movement to a space adjacent an aircraft to be started/ serviced. Housing 12 has a control panel 14 on a front surface thereof. Battery system 10 is a 26 volt system (not a 24 volt system) with an aircraft starting battery and an aircraft service battery. A power cable 16 is stored at the front of housing 12 for connecting system 10 to an aircraft.

Figure 2:
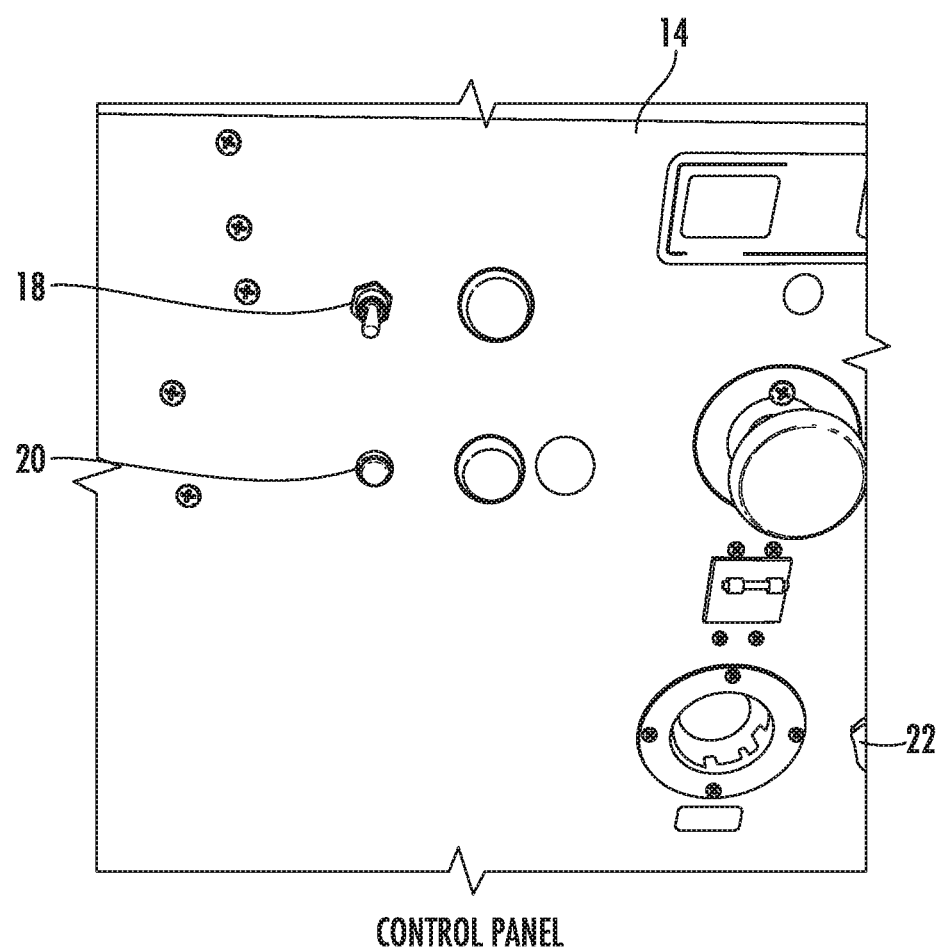
FIG. 2 is an enlarged view of the control panel for the start/service aircraft battery system of FIG. 1.

Referring additionally to FIG. 2, control panel 14 includes a toggle switch 18 for changing system 10 between the starting and the service modes of operation. A push button 20, positioned below switch 18, is included to activate a bulk charger discussed in more detail below. A 220 volt AC electrical input 22 is provided in control panel 14. In addition to control panel 14, a low voltage warning light is provided on the upper surface of housing 12.

Figure 3:
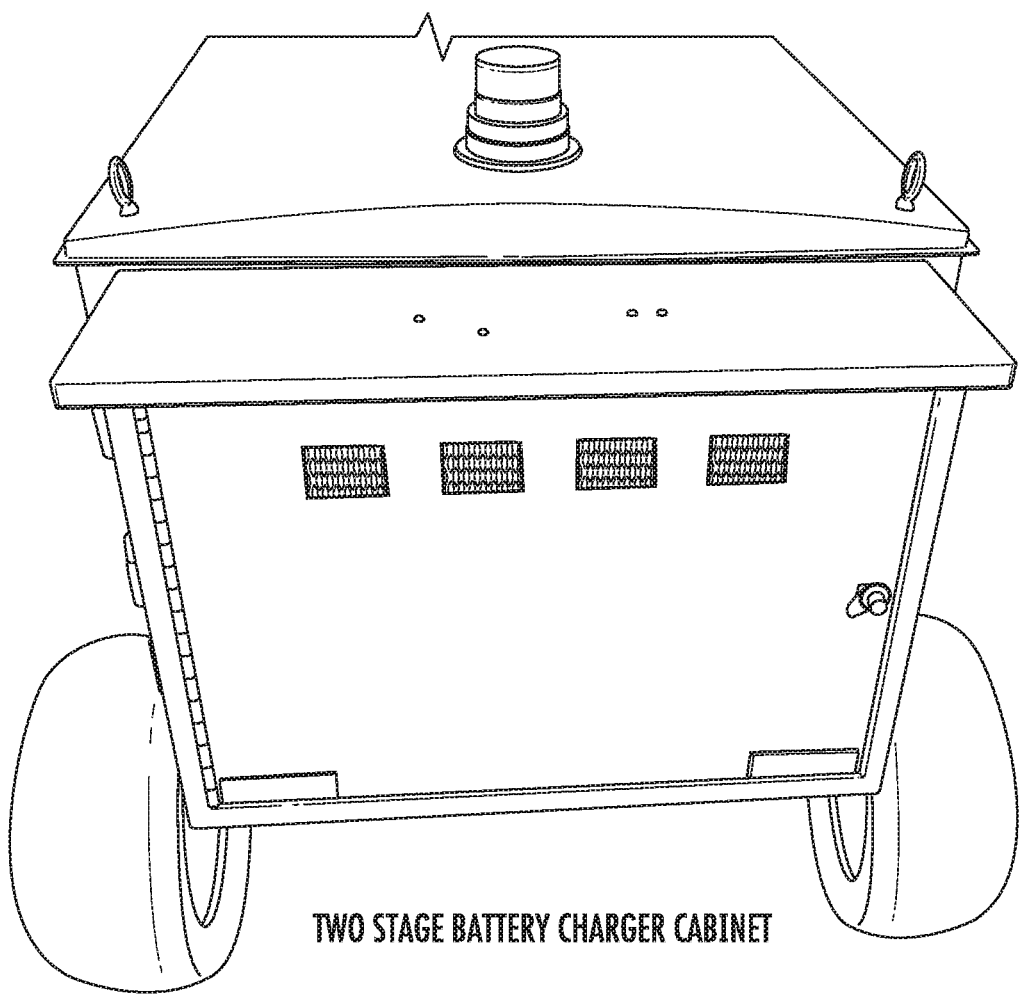
FIG. 3 is an enlarged view of the two-stage battery charger for the start/service aircraft battery system of FIG. 1.

A two-stage battery charger in a cabinet situated at the rear of housing 12 is illustrated more clearly in FIG. 3. The novel two-stage charging arrangement is provided to quickly recharge the batteries to full content after each use of system 10. This novel two-stage charging arrangement allows the next use of system 10 to be very rapid.

Figure 4:
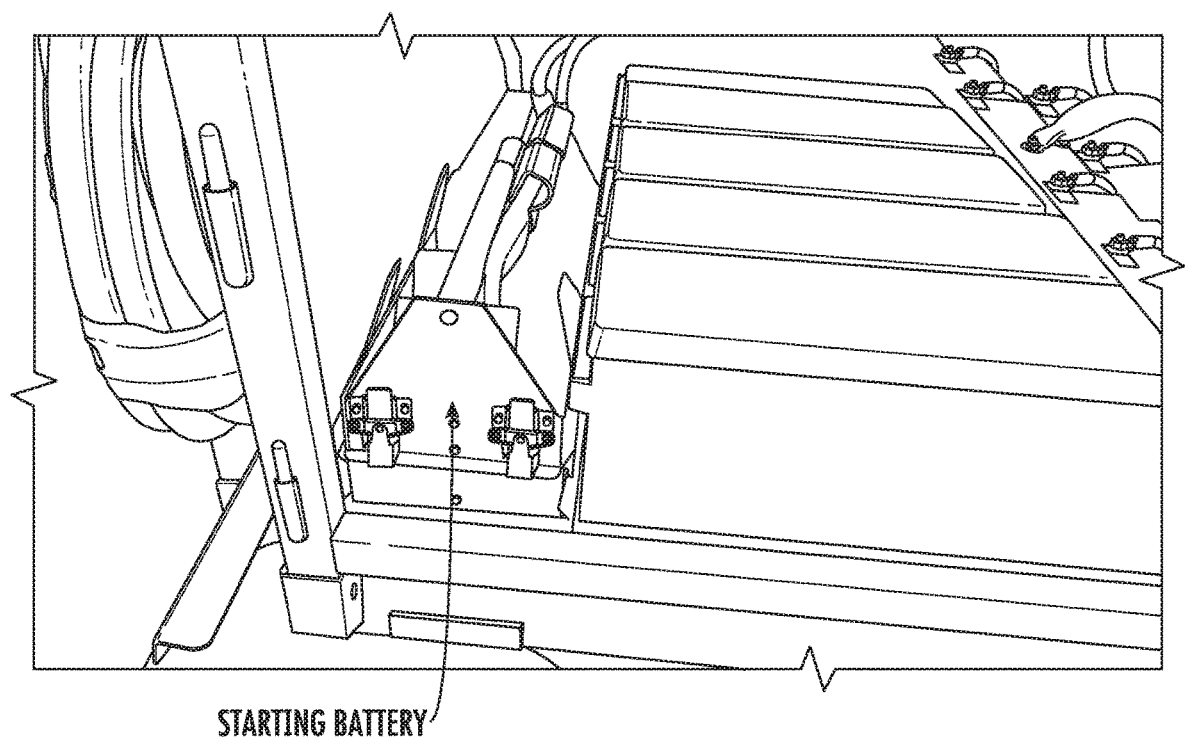
FIG. 4 is a perspective side view of the starting battery for the start/service aircraft battery system of FIG. 1.
Figure 5:
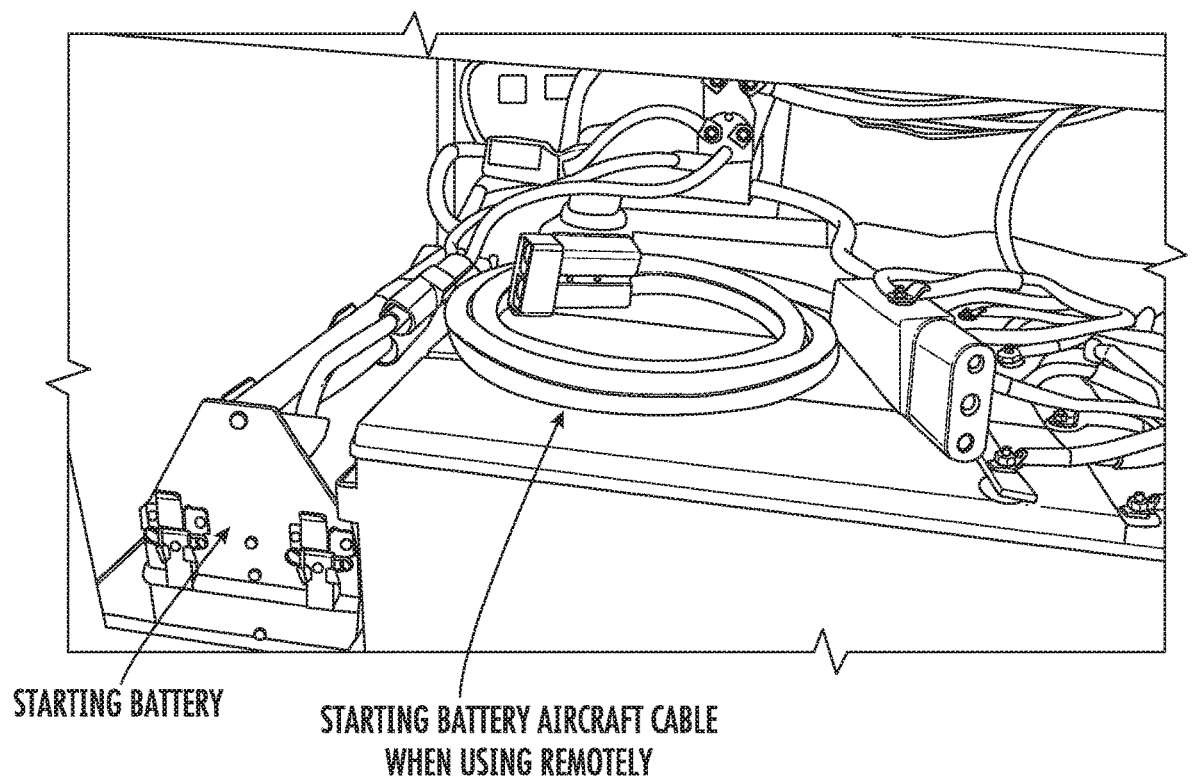
FIG. 5 is a perspective view of the starting battery and adjacent remote use aircraft cable for the start/service aircraft battery system of FIG. 1.
Figure 6:
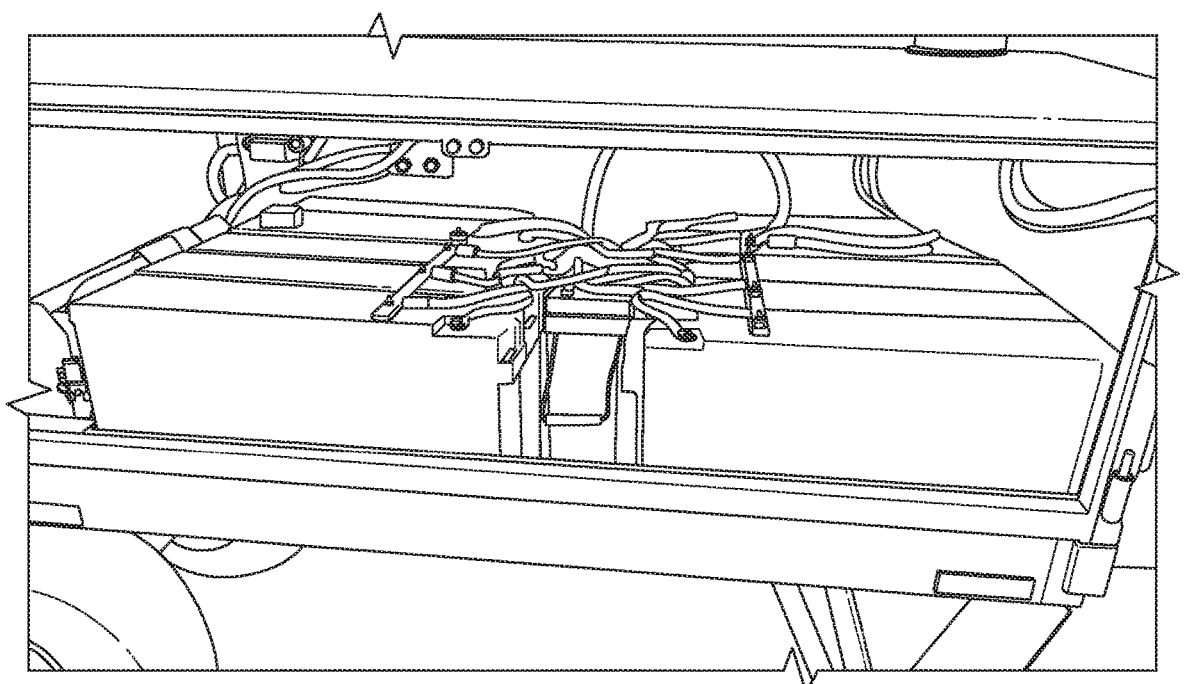
FIG. 6 is an enlarges perspective view of the service battery for the start/service aircraft battery system of FIG. 1.

Referring additionally to FIGS. 4 and 5, the staring battery can be seen in more detail. As can be seen in these views, the staring battery is provided in a removable state so that it can be decoupled from and moved from housing 12, along with the remote cable illustrated in FIG. 5, to start an aircraft remote from the normal starting/service process. Normally, the starting battery is simply left in housing 12 and connected through cable 16 (see wiring diagrams below) to an aircraft. The starting battery is a relatively small battery designed to provide only power for the starting operation. Before the aircraft is started, and can provide its own electrical power, system 10 is switched to the service mode of operation (switch 18 in FIG. 2) and a service battery, illustrated in FIG. 6, is connected to the aircraft by cable 16. The service battery is a much larger battery, since it may have to provide power to run an aircraft's systems for an extended period of time, and in this preferred embodiment includes 13 modules of 26 volt batteries electrically coupled into a single component. Both the starting battery and the service battery are 26 volts in this preferred embodiment, but the starting battery can be as high as 28 volts to ensure sufficient starting power and surge.

Figure 7:
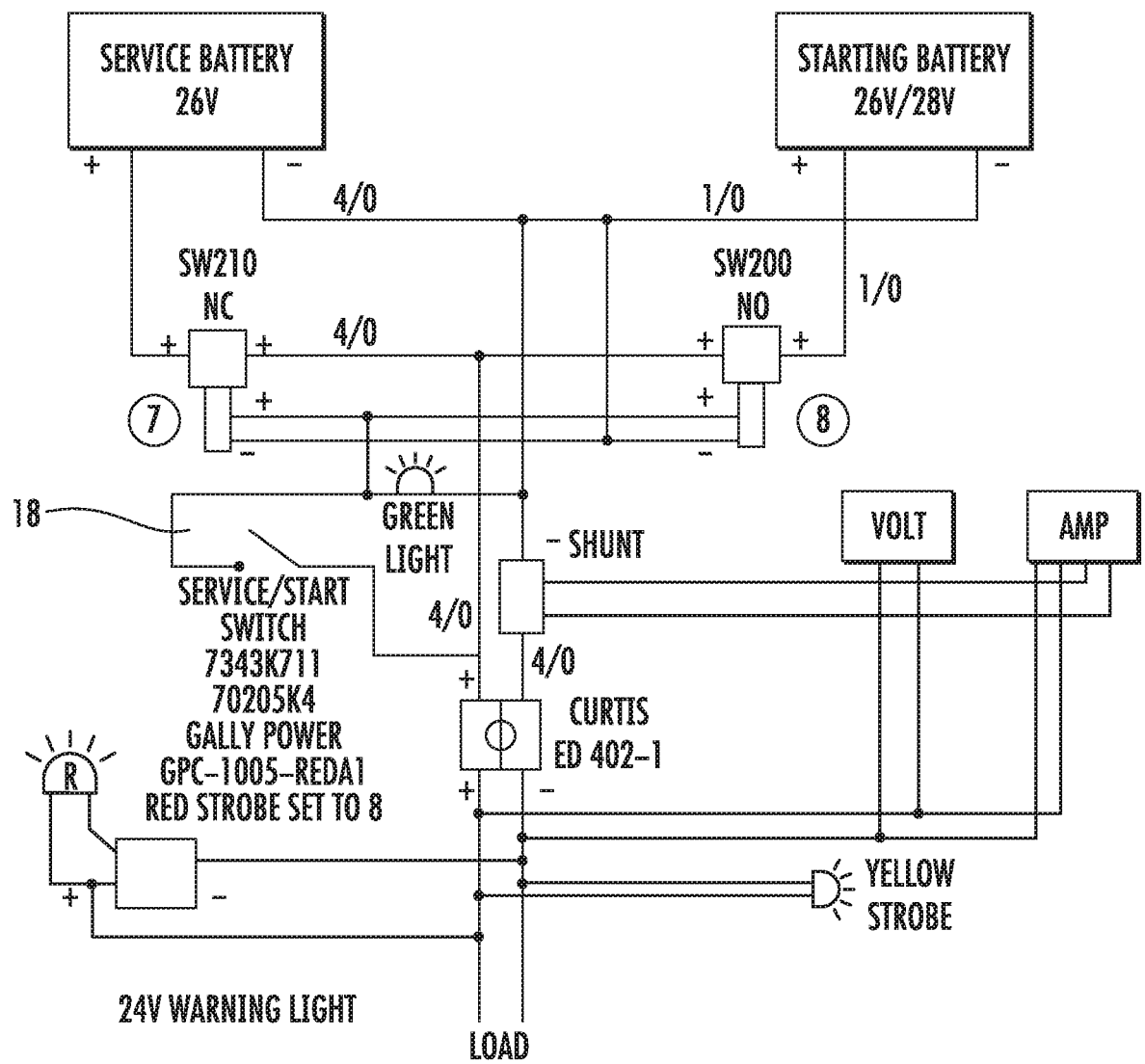
FIG. 7 is a battery output wiring diagram for the service battery for the start/service aircraft battery system of FIG. 1.

Turning to FIG. 7, the starting battery and the service battery are illustrated coupled to a "load" output (cable 16) through relays sw200 and sw210, respectively. Relays sw200 and sw210 are energized alternatively by starting battery switch 18. Output voltage and current are indicated on volt and amp meters included in control panel 14. Power for the various switches and indicators/strobes is supplied by an internal power supply indicated in FIG. 7 as "galley power". It should be noted that the starting battery is attached to the system so that it can be easily and quickly disconnected from the system and used for starting other aircraft while the service battery is still connected to an original aircraft for service purposes. Note for example in FIG. 8, the starting battery can be simply disconnected from the output bus of the converter once it is charged.

Figure 8:
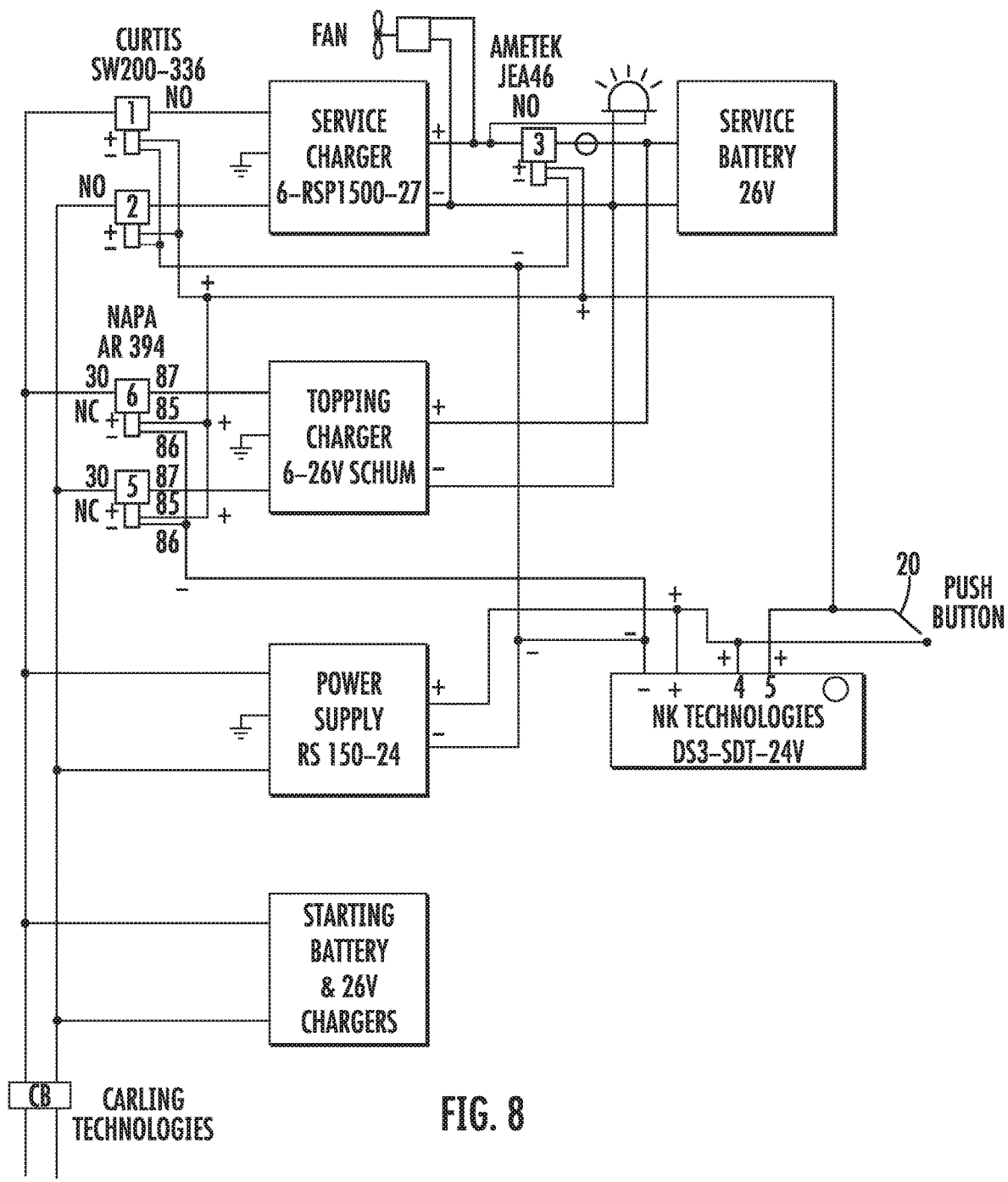
FIG. 8 is a charging system wiring diagram for the start/service aircraft battery system of FIG. 1.

Turning to FIG. 8, a charging system wiring diagram is illustrated with the staring battery and chargers at the bottom of a stack of elements, the internal power supply for operating system 10 next, a topping charger next and the service charger at the top. A 220 volt Ac source of power is attached to an input at the lower left of the diagram and converted to a DC voltage by a converter indicated as "CB". The starting battery is attached directly to the output bus of the converter and is charged directly since it is relatively small and can quickly charge to capacity after which charging automatically stops. The internal power supply is attached directly to the output bus of the converter and supplies power to the various switches, indicators/strobes etc. The topping charger is attached to the output bus of the converter through relays designated "5" and "6" which are controlled by push button 20. The service charger is attached to the output bus of the converter through relays designated "1" and "2" which are controlled by push button 20. The service charger and the topping charger are electrically connected to the service battery. In operation, the service charger starts the charging process for the service batteries. In many instances the service battery may be only connected to an aircraft for a short time and charging through the service charger may be sufficient. In instances where the service battery has been severely drained, after a determined period of time push button 20 can be depressed and the topping charger will be connected to provide an additional charge for a quick return to an operating condition.

Thus, a new and improved start/run aircraft battery system is provided. The system is designed to provide service power to aircraft, provide power to start aircraft and to be recharged for the next use by readily available 220 volt clean power. No diesel engines or the like are included so that the system is virtually pollution free and relatively inexpensive. Further, because no diesel engines or the like are included, the system is convenient and easy to use and because of the novel two-stage recharging, system 10 is ready to use in a very short time.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A start/service aircraft battery system comprising:
   a housing on wheels/dolly for convenient movement to a space adjacent an aircraft to be started/serviced, an electrical output cable carried by the housing and attachable to the aircraft to be started/serviced;
   a control panel on the housing including a start/service switch having a start position and a service position;
   a starting battery and a larger service battery carried by the housing, the starting battery being coupled to the electrical output cable through the start/service switch in the start position and the larger service battery being coupled to the electrical output cable through the start/service switch in the service position; and
   the starting battery being removably attached to the start/service aircraft battery system for individual starting operations.

2. The start/service aircraft battery system as claimed in claim 1 wherein the housing further includes a charging system.

3. The start/service aircraft battery system as claimed in claim 2 wherein the charging system includes a power source input electrically coupled to the starting battery and through a two stage charger to the larger service battery.

4. The start/service aircraft battery system as claimed in claim 3 wherein the control panel includes a bulk charger switch with electrically coupled associated relays, and the two stage charger includes a service charger and a topping charger electrically coupled to the service battery through the bulk charger switch and associated relays, the bulk charger switch and associated relays having a first position in which the service battery is electrically coupled to the service charger and a second position in which the service battery is electrically coupled to the topping charger.

5. A start/service aircraft battery system comprising:
a housing on wheels/dolly for convenient movement to a space adjacent an aircraft to be started/serviced, an electrical output cable carried by the housing and attachable to the aircraft to be started/serviced;
a control panel on the housing including a start/service switch having a start position and a service position and a bulk charger switch with electrically coupled associated relays;
a starting battery and a larger service battery carried by the housing, the starting battery being coupled to the electrical output cable through the start/service switch in the start position and the larger service battery being coupled to the electrical output cable through the start/service switch in the service position;
the housing further including a charging system having a power source input electrically coupled to the starting battery and through a two stage charger to the larger service battery, the two stage charger being electrically coupled to the larger service battery through the bulk charger switch with electrically coupled associated relays; and
the starting battery being removably attached to the start/service aircraft battery system for individual starting operations.

6. The start/service aircraft battery system as claimed in claim 5 wherein the two stage charger includes a service charger and a topping charger electrically coupled to the service battery through the bulk charger switch and associated relays, the bulk charger switch and associated relays having a first position in which the service battery is electrically coupled to the service charger and a second position in which the service battery is electrically coupled to the topping charger.

7. A method of starting and servicing an aircraft including the steps of:
providing a start/service aircraft battery system comprising:
a housing on wheels/dolly for convenient movement to a space adjacent an aircraft to be started/serviced, an electrical output cable carried by the housing and attachable to the aircraft to be started/serviced;
a control panel on the housing including a start/service switch having a start position and a service position;
a starting battery and a larger service battery carried by the housing, the starting battery being coupled to the electrical output cable through the start/service switch in the start position and the larger service battery being coupled to the electrical output cable through the start/service switch in the service position; and
the starting battery being removably attached to the start/service aircraft battery system for individual starting operations;
moving the housing adjacent an aircraft to be started/serviced, placing the start/service switch in the start position and connecting the electrical output cable to the aircraft; and
once the aircraft is started, moving the start/service switch to the service position.

8. The method as claimed in claim 7 wherein the step of providing a start/service aircraft battery system includes providing a control panel on the housing including a bulk charger switch with electrically coupled associated relays and the housing further including a charging system having a power source input electrically coupled to the starting battery and through a two stage charger to the larger service battery, the two stage charger including a service charger and a topping charger, and the two stage charger being electrically coupled to the larger service battery through the bulk charger switch with electrically coupled associated relays.

9. The method as claimed in claim 8 further including the steps of placing the bulk charger switch in a service charge orientation and connecting the power source input to an external source of power and moving the bulk charger switch to a topping orientation when the service charger is done charging.

* * * * *